United States Patent
Piazza

[11] Patent Number: 5,107,980
[45] Date of Patent: Apr. 28, 1992

[54] HIGH SPEED SCREW FEEDER DEVICE FOR SHAPED CONTAINERS OR BOTTLES IN GLASS OR PLASTIC MATERIAL

[75] Inventor: Gastone Piazza, Marmirolo, Italy

[73] Assignee: Alfa Construzioni Maccaniche S.p.A., Mantova, Italy

[21] Appl. No.: 613,229

[22] Filed: Nov. 9, 1990

[30] Foreign Application Priority Data

Jan. 3, 1990 [IT] Italy ............................... 40001 A/90

[51] Int. Cl.⁵ ............................................. B65G 33/26
[52] U.S. Cl. .................................. 198/676; 198/467.1
[58] Field of Search ................. 198/467.1, 661, 676

[56] References Cited

U.S. PATENT DOCUMENTS

| | | | |
|---|---|---|---|
| 2,571,036 | 10/1951 | Heyne et al. | 198/676 X |
| 2,630,904 | 3/1953 | Bozek | 198/676 X |
| 2,645,399 | 7/1953 | Bozek et al. | 198/467.1 X |
| 2,854,125 | 9/1958 | Johnson | 198/467.1 X |
| 4,265,357 | 5/1981 | Amberg et al. | 198/467.1 X |
| 4,789,016 | 12/1988 | Mihail | 198/467.1 X |
| 4,923,571 | 5/1990 | Kronseder | 198/467.1 X |
| 4,969,348 | 11/1990 | Clowes et al. | 198/676 X |

FOREIGN PATENT DOCUMENTS 2435567 2/1976 Fed. Rep. of Germany ... 198/467.1
1323480 7/1987 U.S.S.R. ............................... 198/661

*Primary Examiner*—Joseph E. Valenza
*Assistant Examiner*—James R. Bidwell
*Attorney, Agent, or Firm*—Darby & Darby

[57] ABSTRACT

The device, comprising a horizontal feed screw (9) and a conveyor belt (14), is of the type as used for feeding containers or bottles (11) to special machine units, typically labelers, fillers, cappers and rinsers; the screw is of mixed pitch, its exact geometry being suited to the shape and material of the container and the type of machine serviced by the device, and operates in conjunction with freely revolving rollers (10) mounted in pairs to rocker arms (8) with their axes vertical and parallel to the axis of the bottle or container, which are also able to traverse at right angles to the screw axis and pivotable about the fulcrum of the relative rocker arm, in such a way that the containers are conveyed along the belt (14) in contact with the screw on the one side, restrained and guided by the rollers on the side opposite, and emerge correctly positioned and undamaged at the runout.

11 Claims, 3 Drawing Sheets

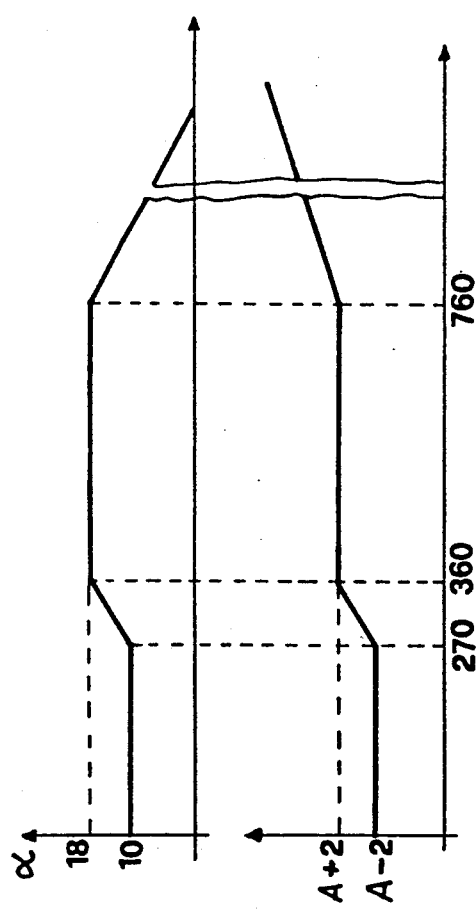
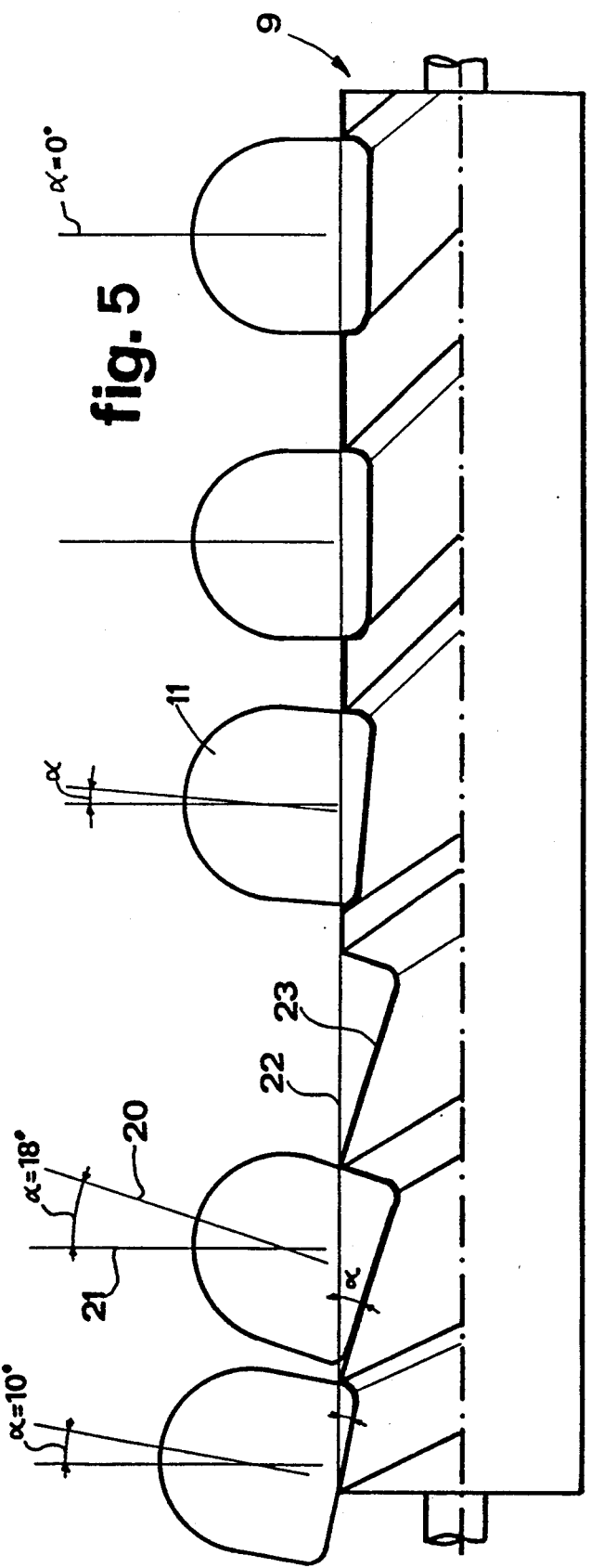

HIGH SPEED SCREW FEEDER DEVICE FOR SHAPED CONTAINERS OR BOTTLES IN GLASS OR PLASTIC MATERIAL

BACKGROUND OF THE INVENTION

The present invention relates to a high speed screw feeder for shaped containers or bottles fashioned in glass or plastic material.

Conventional screw devices comprise a horizontally disposed feed screw, a belt by which containers conveyed along the feed screw are supported from beneath, and a stationary fence positioned on the side of the belt opposite from the screw, parallel with the screw axis.

Such devices are widely utilized in transferring bottles to labeling or rinsing stations, or other bottling plant equipment.

The fence serves to restrain and guide the bottles on the side farthest from the screw.

Whilst conventional devices of the type in question function well enough with the familiar container or bottle of cylindrical shape, narrowing at the neck, drawbacks are encountered in the case of containers or bottles differently embodied, such as those of oval section, of rectangular or square section with well defined corners, and especially, for example, in the case of bottles exhibiting a cross section appearing square with rounded corners substantially of "Dee" shape.

The irregular outline of such containers, in fact, prevents the device from operating at high speed as this leads to jamming caused by the shattering of bottles, in the case of glass, or as the result of plastic containers becoming flattened.

Such situations arise by reason of the fact that the non-cylindrical containers or bottles can enter the screw feeder in a diversity of positions, each theoretically requiring a corresponding adjustment of the device in order that the relative shape can be accommodated by the blade of the screw.

Accordingly, as the speed of rotation of the screw is increased, and the feed velocity of the bottles or containers thus raised, the problems associated with shape are multiplied.

Such is the case more especially with containers in plastic material, which are easily deformable.

The object of the present invention is to eliminate the drawbacks mentioned above, and in particular to provide a device by which containers or bottles of non-cylindrical or irregular shape can be conveyed at high speed without any risk of the screw being jammed by shattered glass or deformed plastics. It is a further object of the invention to ensure that containers are taken up and conveyed by the screw in such a way that each will exit from the device correctly positioned.

SUMMARY OF THE INVENTION

The stated objects are comprehensively realized in a high speed screw feeder for shaped containers or bottles in glass or plastic material, according to the present invention.

Such a device comprises a feed screw disposed with its center axis substantially horizontal, of which the helical pitch is varied to suit the shape and material of the containers and the type of machine next in succession, a belt by which the containers conveyed by the screw are supported from beneath, and a plurality of rollers carried by rocking arms and flanking the belt along the side opposite from the screw; in addition to being rotatable about their own axes, the rollers are able to traverse in a direction normal to the axis of the screw and pivotable about the fulcrum of the relative arm.

Thus, the containers or bottles advance in contact with the helical blade of the screw on the one hand and the moving rollers on the other.

BRIEF DESCRIPTION OF THE DRAWINGS

The invention will now be described in detail, by way of example, with the aid of the accompanying drawings, in which:

FIG. 3 is a graph showing the angle between the median vertical plane of a container and a line normal to the screw axis;

FIG. 4 is a graph showing the pitch of the feed screw; and

FIG. 5 is an illustration of the feed screw and containers, viewed in plan from above.

DESCRIPTION OF THE PREFERRED EMBODIMENTS

Figure 1:
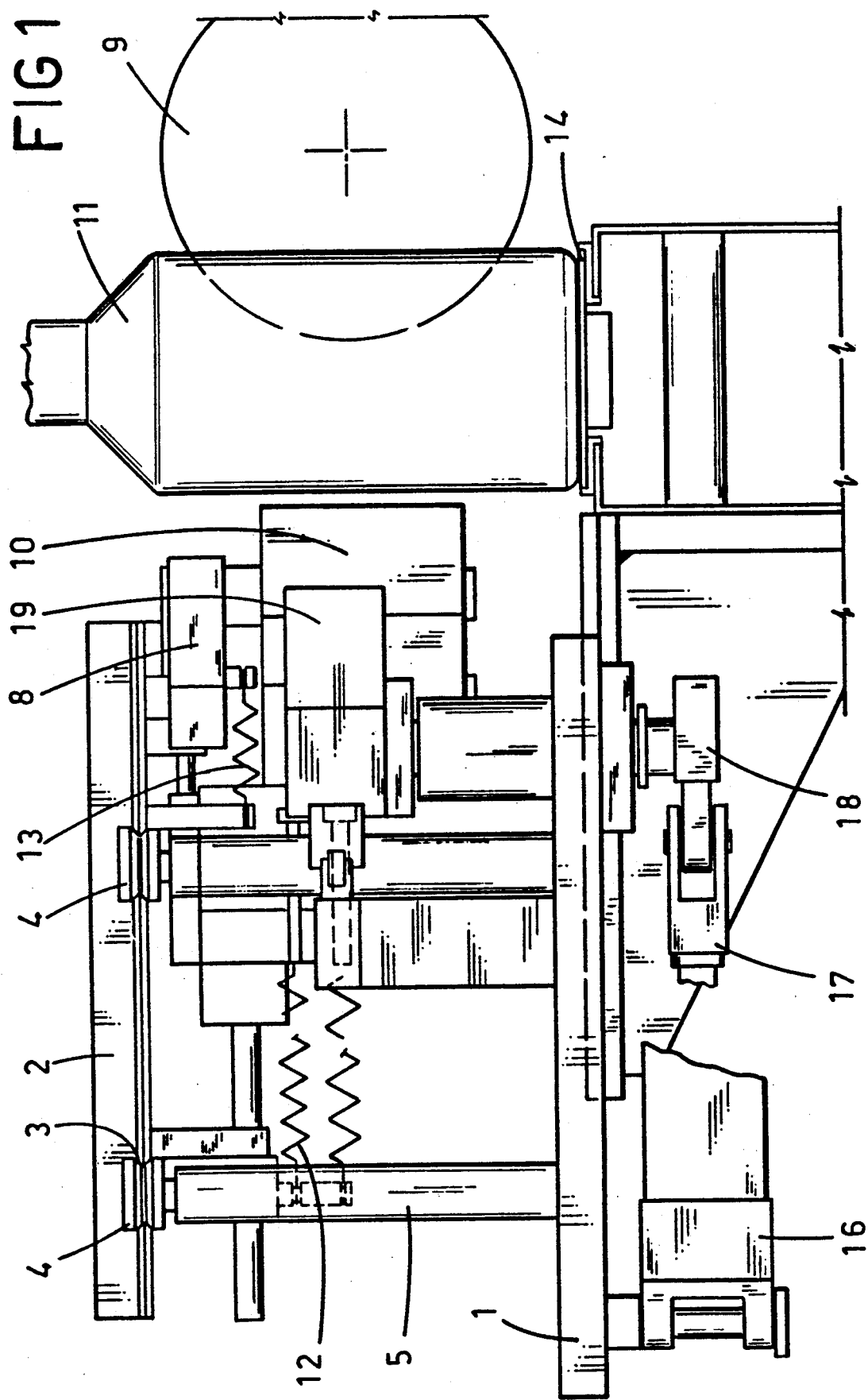
FIG. 1 is an illustration of the device in its entirety, viewed in side elevation along the axis of the feed screw.

With reference to the drawings, 1 denotes a frame supporting a plurality of rails 2 engaging slidably in grooves 3 afforded by a plurality of bearing wheels 4. Certain of the grooved wheels 4 will be supported by posts 5 rigidly associated with the frame 1 of the device, and others by a plate 6 that provides the mounting for a cylinder 7 by means of which to adjust the position of the rails 2.

8 denotes an arm mounted pivotably to each rod 2 at the end directed toward a feed screw denoted 9; the arms 8 are thus capable of rocking motion and serve to carry a plurality of cylindrical rollers 10 fashioned in flexible rubber, the center axes of which are disposed substantially perpendicular to the longitudinal axis of the screw, hence to the feed direction of the containers or bottles 11. The rollers 10 can be traversed in a direction normal to the axis of the screw 9, and are capable of rotating about the point at which the relative arm 8 is pivoted to the rail 2; each roller 10 also revolves about its own center axis.

12 denotes a spring associated with each rail 2 in such a way as to bias the rail toward the screw 9. 13 denotes a spring associated with each arm 8, by which the arm is biased toward a position, angled in relation to the rail, such that one only of the two rollers 10 carried by the arm is positioned over a conveyor belt 14 supporting the containers or bottles from beneath.

The springs 12 and 13 together with the arms 8 and the grooved wheels 4 constitute means by which to enable movement of the rails 2, independently of one another, and similarly independent movement of the cylindrical rollers 10, as the containers or bottles are taken up and conveyed by the screw.

15 denotes a bar associated with the cylinder 7, which serves to distance the rails 2 from the screw when the device is at rest or inoperative.

16 denotes a pneumatic cylinder supported by the frame 1 of the device, of which the rod 17 impinges by way of an interconnecting plate 18 on a stop 19 serving to disallow passage of the containers or bottles 11 to the screw.

The cylinder 16 and its rod 17, together with the plate 18 and the stop 19, constitute means by which to allow or disallow passage of the containers or bottles to the screw 9.

The screw 9 is disposed with its axis substantially horizontal, and exhibits irregular pitch.

More exactly, the pitch of the helix on entry to the screw, for the initial 270° of its rotation, is equal to A - 2 mm (where A is the maximum transverse dimension of the container); for the following 400° of rotation, the pitch becomes A+2 mm; thereafter and along the remaining length of the screw, the pitch increases progressively until coinciding with that ultimately required, namely the pitch of the next machine in succession. The variation in pitch of the feed screw 9 is shown in FIGS. 4 and 5.

Figure 2:
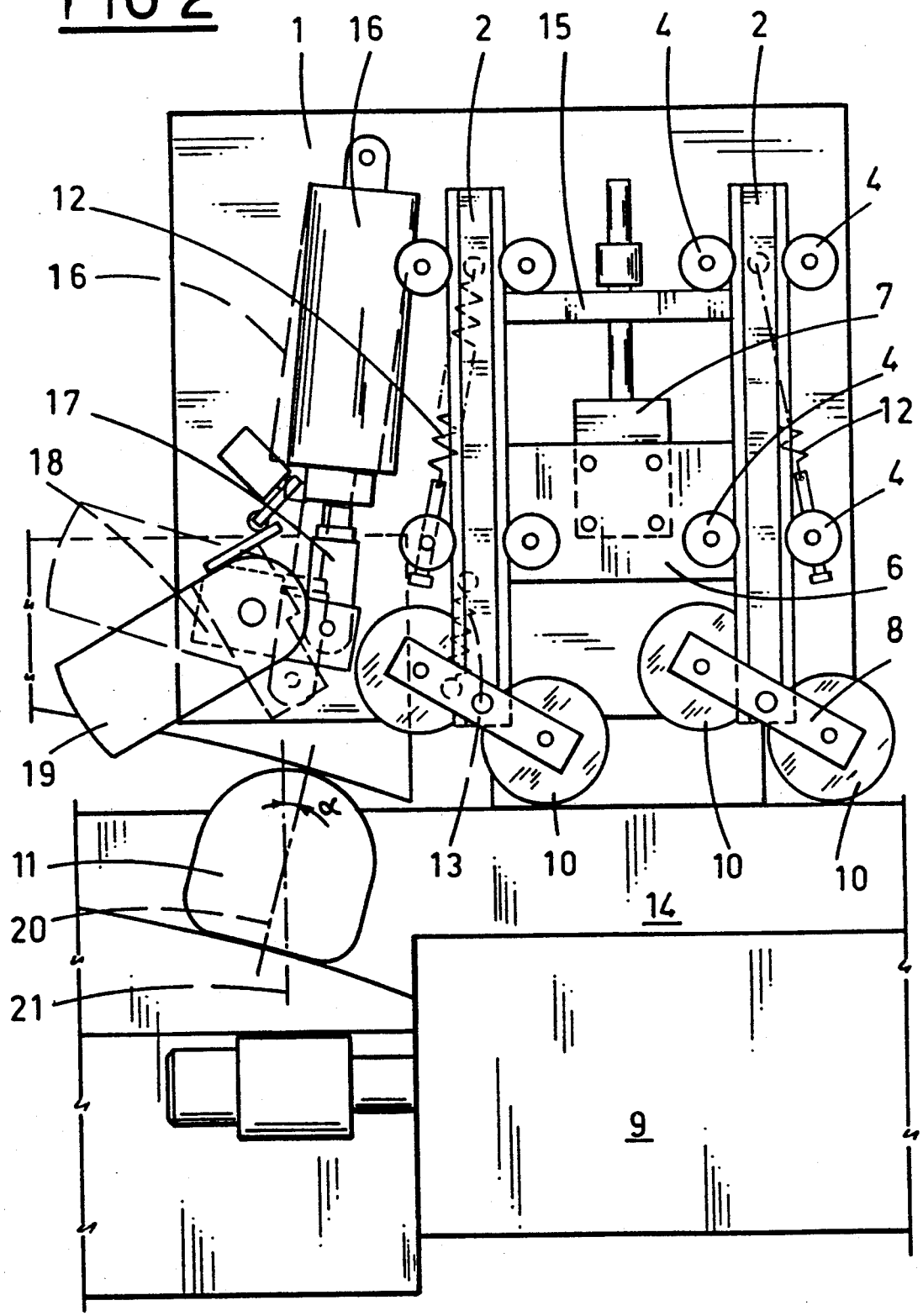
FIG. 2 is an illustration of the device in its entirety, viewed in plan from above.

The profile of the screw 9 through the initial 270° of its rotation is calculated such that a straight line 20 coinciding with the median vertical plane of a bottle or container 11, correctly positioned as in FIG. 2, will create an angle $\alpha$ of 10° with a straight line 21 normal to the screw axis. This angle $\alpha$ widens to 18° during rotation of the screw through a further 400°, before narrowing and reducing ultimately to zero at the runout. The variation in the angle $\alpha$ is shown in FIGS. 3 and 5.

As regards operation of the device, two essential conditions are discernible: feed activated, and feed deactivated or at rest.

With feed activated, the stop 19 is drawn clear and thus allows the containers 11 to reach the screw.

Passage of the containers or bottles 11 along the screw 9 is favored and checked by the independently articulated movement of the pivoting and revolving rollers 10 and traversing rails 2, which combine to ensure that the containers emerge from the screw correctly positioned and spaced to coincide with the pitch of the successive machine.

With feed deactivated, the stop 19 is rotated into a position whereby the containers or bottles are disallowed access to the screw.

In addition, the bar 15 is drawn back from the feed path by the relative cylinder 7, thereby distancing the rails 2 from the conveyor belt 14 to a position in which the rollers 10 are prevented from entering into contact with the last remaining containers or bottles to run through.

What is claimed:

1. A high speed screw feeder device for shaped containers or bottles in glass or plastic material, comprising:
    a feed screw (9) disposed with its center axis substantially horizontal, of which the helical pitch is irregular, departing from an initial value less than the maximum transverse dimension of the container or bottle, becoming greater than the maximum transverse dimension of the container or bottle and thereafter increasing progressively until equal to the pitch of the next machine in succession, and of which the profile is calculated in such a manner that the initially acute angle defined by a straight line (20) coinciding with the median plane of a correctly positioned container and a straight line (21) normal to the center axis becomes wider subsequently before narrowing and reducing to zero prior to the point at which the container runs out from the device;
    a belt by which the containers or bottles conveyed along the screw are supported from beneath.

2. A screw feeder device as in claim 1, wherein the geometry of the screw comprises:
    a first stretch corresponding to initial rotation of the helix through 270°, of which the pitch is equal to A - 2 mm (where A is the maximum transverse dimension of a single container), and the profile such that a straight line (20) coinciding with the median plane of a correctly positioned container and a straight line (21) normal to the center axis form an angle of 10°;
    a second stretch corresponding to rotation of the helix through a further 400°, of which the pitch is lengthened to A +2 mm and the position angle of the container widened to 18°;
    a final stretch encompassing the remaining length of the screw, through which the pitch of the helix increases progressively to a predetermined value and the position angle of the container narrows to 0°.

3. A screw feeder device according to claim 1, wherein means by which to allow or disallow the passage of containers or bottles onto the feed screw comprise a pneumatic cylinder of which the rod impinges by way of a connecting plate with a stop.

4. A screw feeder device according to claim 1, comprising means by which to enable movement of a plurality of rails independently of one another and of a plurality of cylindrical rollers independently of one another wherever containers or bottles are conveyed along the screw comprising a plurality of grooved wheels, a plurality of rocking arms, a plurality of springs associated one with each rail and serving to bias the rails toward the screw, and a plurality of springs associated one with each arm by which the arms are biased at an angle in relation to the corresponding rails in such a way that the two rollers of each arm are positioned normally at dissimilar distances from the screw.

5. A high speed screw feeder device for shaped containers or bottles in glass or plastic material, comprising:
    a feed screw (9) disposed with its center axis substantially horizontal;
    a belt by which containers or bottles conveyed along the screw are supported from beneath;
    a plurality of rollers (10) carried by rocking arms (8) and flanking the belt (14) along the side opposite from the screw, each capable of traversing in a direction substantially normal to the screw axis, pivotable about the fulcrum of the relative rocking arm, and rotatable about its own axis.

6. A screw feeder device as in claim 5, further comprising:
    at least two rails (2), each of which carries one arm (8) pivotably mounted to the end directed toward the screw (9) and supporting cylindrical rollers (10) of which the center axes are disposed substantially perpendicular to the screw axis;
    a plurality of wheels (4) affording respective grooves (3) in which the rails (2) are slidably accommodated, certain of which carried on posts (5) rigidly associated with the main frame (1) of the device and others carried by a plate (6) affording support to a cylinder (7) serving to adjust the position of the rails;
    means by which to allow or disallow the passage of containers or bottles (11) onto the feed screw (9);
    means by which to enable movement of the rails (2) independently of one another and of the cylindrical rollers (10) independently of on another whenever containers or bottles (11) are conveyed along the screw (9), in such a way that the containers or bottles advance in contact with the helical surface of the screw on the one hand and with the moving cylindrical rollers on the other and run out from the screw correctly positioned.

7. A screw feeder device as in claim 6, wherein the rails (2) are two in number, and each arm (8) carries two cylindrical rollers (10) fashioned in flexible rubber.

8. A screw feeder device as in claim 6, wherein the cylinder (7) is associated with a bar (15) and designed to distance the rails (2) from the screw in such a way that the rollers (10) are prevented from occupying the space above the belt (14).

9. A high speed screw feeder device for shaped containers or bottles in glass or plastic material, comprising:
- a feed screw (9) disposed with its center axis substantially horizontal, of which the helical pitch is irregular, departing from an initial value less than the maximum transverse dimension of the container or bottle, becoming greater than the maximum transverse dimension of the container or bottle and thereafter increasing progressively until equal to the pitch of the next machine in succession, and of which the profile is calculated in such a manner that the initially acute angle defined by a straight line (20) coinciding with the median plane of a correctly positioned container and a straight line (21) normal to the center axis becomes wider subsequently before narrowing and reducing to zero prior to the point at which the container runs out from the device;
- a belt by which the containers or bottles conveyed along the screw are supported from beneath;
- a plurality of rollers (10) carried by rocking arms (8) and flanking the belt (14) along the side opposite from the screw, each capable of traversing in a direction substantially normal to the screw axis, pivotable about the fulcrum of the relative rocking arm, and rotatable about its own axis.

10. A screw feeder device according to claim 9, further comprising means by which to allow or disallow the passage of container or bottles into the feed screw comprising a pneumatic cylinder of which the rod impinges by way of a connecting plate with a stop.

11. A screw feeder device according to claim 10, further comprising means by which to enable movement of a plurality of rails independently of one another and of a plurality of cylindrical rollers independently of one another whenever containers or bottles are conveyed along the screw, comprising a plurality of grooved wheels, a plurality of rocking arms, a plurality of springs associated one with each rail and serving to bias the rails toward the screw, and a plurality of springs associated one with each arm, by which the arms are biased at an angle in relation to the corresponding rails in such a way that the two rollers of each arm are positioned normally at dissimilar distances from the screw.

* * * * *